H. L. BAYLIES.
TROLLEY WHEEL.
APPLICATION FILED APR. 9, 1909.
942,767.
Patented Dec. 7, 1909.
2 SHEETS—SHEET 1.
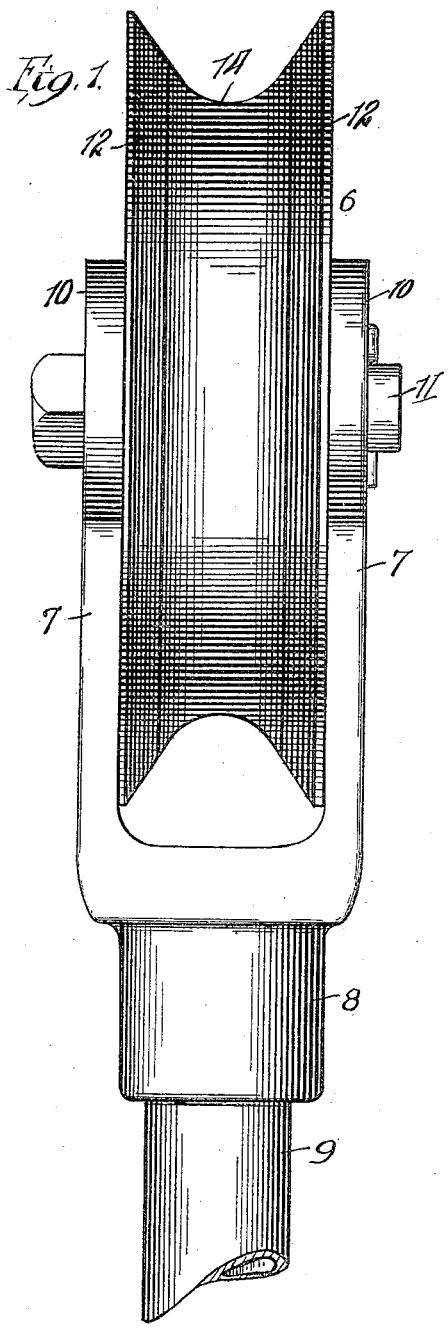
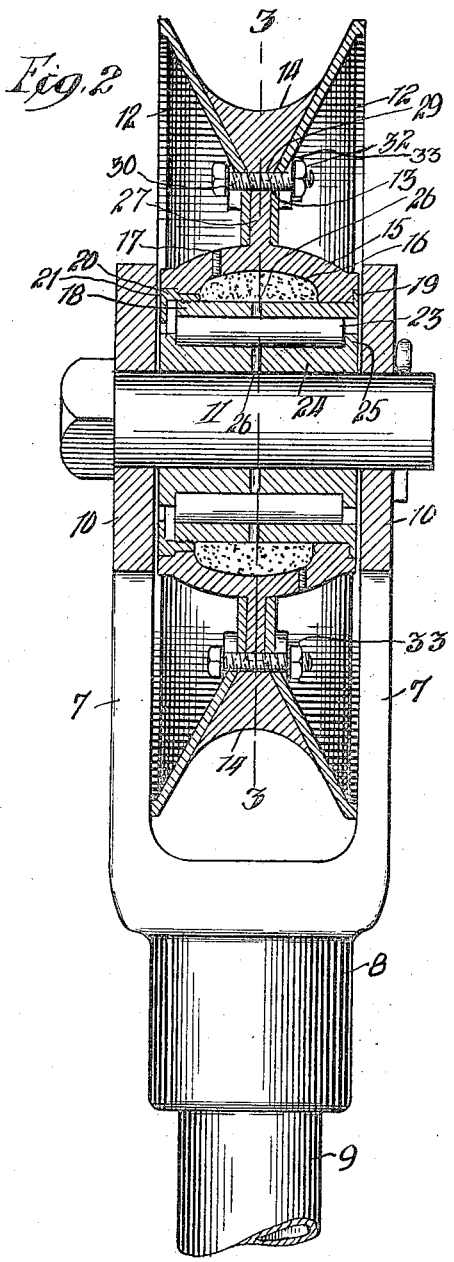
Witnesses:
Wm. P. Bond
Pierson W. Banning
Inventor:
Harry L. Baylies
by Banning & Banning
Attys

H. L. BAYLIES.
TROLLEY WHEEL.
APPLICATION FILED APR. 9, 1909.

942,767.

Patented Dec. 7, 1909.
2 SHEETS—SHEET 2.

Witnesses:
Wm. P. Bond
Pierson W. Banning.

Inventor:
Harry L. Baylies
by Banning & Banning
Attys.

UNITED STATES PATENT OFFICE.

HARRY L. BAYLIES, OF CHICAGO, ILLINOIS.

TROLLEY-WHEEL.

942,767. Specification of Letters Patent. Patented Dec. 7, 1909.

Application filed April 9, 1909. Serial No. 488,994.

*To all whom it may concern:*

Be it known that I, HARRY L. BAYLIES, a citizen of the United States, residing at Chicago, in the county of Cook and State of Illinois, have invented certain new and useful Improvements in Trolley-Wheels, of which the following is a specification.

This invention relates to an improved construction in trolley wheels and has for its essential object to make the wheel in such manner that the central bearing portion of the trolley wheel rims which, when in use is in constant engagement with the suspended trolley wire, may be removed therefrom when worn out and a new part substituted therefor.

The invention further relates to the hub construction of the device and to its various parts which enable the wheel to be readily assembled and secured together.

The invention consists in the features of construction and combination of parts hereinafter described and claimed.

Figure 3:
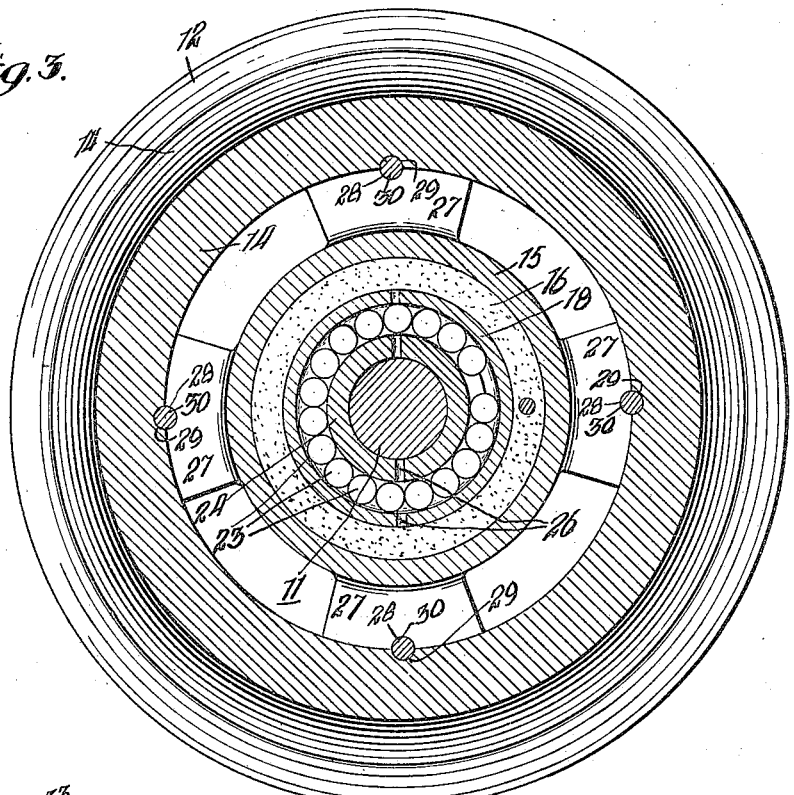
Figure 5:
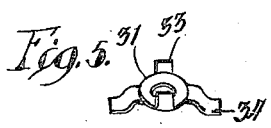
Figure 4:
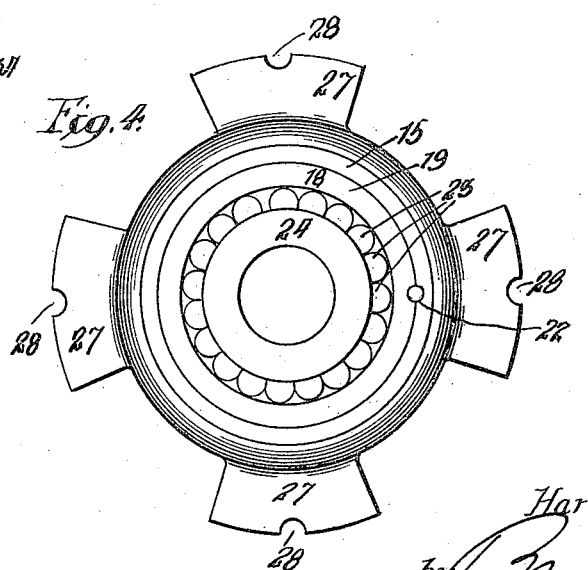

In the drawings Figure 1 is a front view of the trolley wheel; Fig. 2 a vertical sectional elevation thereof; Fig. 3 a transverse section taken on line 3—3 of Fig. 2; Fig. 4 an end elevation of the hub and bearing mechanism; Fig. 5 a detail showing, in perspective, one of the clip members for retaining the bolts in fixed position.

This improved trolley wheel 6 is fixedly mounted within a bracket 7 terminating at its lower end in a ferrule 8 which, in turn, receives and retains the upper end of a trolley pole 9, the outer ends 10 of the bracket arms being formed to engage the wheel axle 11.

Referring to Fig. 2, the body of the trolley wheel comprises a pair of outwardly curved removable rim flanges 12 which have a plurality of holes 13 drilled therethrough adjacent their inner edges, and a central annular bearing portion 14 which has its outer face grooved or beveled in the manner indicated in Figs. 1 and 2, both of its outer edges being of such slope that the outer removable rims 12, when attached thereto, form a smooth even wheel rim. This central annular bearing portion 14 has its body cut away, and at given points thereabout semi-circular grooves are made in its inner side, the grooves corresponding in number to the openings drilled in the removable rim flanges 12, so as to enable all the parts to be locked together.

Referring particularly to Figs. 2 and 4, the annular metallic hub 15 has a concave body 16 which serves as an oil chamber, the oil being admitted, as shown in Fig. 2, through a threaded opening 17 which is plugged up when the wheel is in use. An outer annular bearing body 18 has a peripheral collar 19 formed on one side and is exteriorly threaded on its other side for engaging an interiorly threaded cap or collar 20 whose flange 21 contacts the outer face of the hub. The outer bearing body 18 is positioned, as shown in Fig. 2, within the hub to which it is locked by means of a transverse annular opening 22 formed partially in the hub and partially in the outer bearing body, which enables a locking pin to be inserted therethrough. The roller bearings 23 are disposed transversely between the outer bearing body and the inner bearing body 24 provided with outer rims 25 on both sides thereof. Oil passages 26 are drilled opposite one another through the outer bearing body and through the inner bearing body, so as to enable the oil to flow from the oil chamber 16 through the wheel bearing and about the axle 11. The hub has centrally projecting from its rim a series of lugs 27 which, on their outer edges, are grooved as at 28, for registering with corresponding grooves 29 formed in the central bearing portion 14 which, in turn, enables the outer attachable wheel rims 12 to be locked thereto when bolts 30 are inserted through the respective registered openings.

Referring to Fig. 5, the clip member 31 shown therein is adapted to be inserted about the shank or stem of the bolt 30 adjacent the adjustable nut 32 in such manner that two of its opposite fingers 33 may be bent about the adjustable nut, the two oppositely formed projecting fingers 34 engaging the walls of the openings 13 in the outer rim bodies, forming, in effect, a locking means for preventing the nut 32 from working loose.

The construction of this trolley wheel is such as to permit the central bearing portion to be removed and discarded when worn out, and also to enable a new intermediate portion to be substituted therefor without in any way impairing the original serviceability of the device.

What I claim as new and desire to secure by Letters Patent is:

1. A trolley wheel comprising attachable rims, a central bearing portion having an annular grooved periphery, the bodies of the rims and central bearing portion being cut away, a metallic hub having a concave body serving as an oil chamber, an outer bearing body positioned within the hub, an inner bearing body, roller bearings disposed transversely between the outer bearing and the inner bearing body, an axle engaging the inner bearing body, oil passages formed in both the outer and inner bearing bodies for permitting oil to flow from the oil chamber through the bearings and about the axle, and locking means uniting the parts together, substantially as described.

2. A trolley wheel comprising attachable rims, a central bearing portion having an annular grooved periphery, the bodies of the rims and central bearing portion being cut away, a metallic hub having a concave body serving as an oil chamber, and having lugs projecting therefrom, the respective rims, central bearing portion and lugs having openings therethrough in register with one another, locking means, as bolts, passed through the registered openings, uniting the parts together, an outer bearing body positioned within the hub, an inner bearing body, roller bearings disposed transversely between the inner and outer bearing bodies, an axle engaging the inner bearing body, and oil passages formed in both the inner and outer bearing bodies for permitting oil to flow from the oil chamber through the bearings and about the axle, substantially as described.

HARRY L. BAYLIES.

Witnesses:
WALKER BANNING,
PIERSON W. BANNING.